(12) United States Patent
Marchildon

(10) Patent No.: US 6,604,321 B2
(45) Date of Patent: Aug. 12, 2003

(54) ROTARY PLANT GROWING APPARATUS

(76) Inventor: Ted Marchildon, #10 - 954 S.W. Marine Drive, Vancouver, British Columbia V6P 5Z2 (CA)

( * ) Notice: Subject to any disclaimer, the term of this patent is extended or adjusted under 35 U.S.C. 154(b) by 0 days.

(21) Appl. No.: 09/875,869

(22) Filed: Jun. 8, 2001

(65) Prior Publication Data

US 2002/0144461 A1 Oct. 10, 2002

(30) Foreign Application Priority Data

Apr. 5, 2001 (CA) ............................................. 2343254

(51) Int. Cl.⁷ ............................................... A01G 31/00
(52) U.S. Cl. ................. 47/62 R; 47/59; 47/63
(58) Field of Search ........................... 47/59, 60, 62 R, 47/62 A, 65, 65.5, 66.1, 66.3, 66.4, 66.7, 79, 62 C, 62 E, 62 N, 63, 64

(56) References Cited

U.S. PATENT DOCUMENTS

| | | | | |
|---|---|---|---|---|
| 2,244,677 A | * | 6/1941 | Cornell | |
| 3,254,447 A | * | 6/1966 | Ruthner | |
| 3,254,448 A | * | 6/1966 | Ruthner | |
| 3,339,308 A | * | 9/1967 | Clare | |
| 3,882,634 A | * | 5/1975 | Dedoph | 47/1.2 |
| 3,909,978 A | * | 10/1975 | Fleming | 47/1.2 |
| 3,973,353 A | * | 8/1976 | Dedolph | 47/1.2 |
| 3,998,007 A | * | 12/1976 | Martin | 47/39 |
| 4,250,666 A | * | 2/1981 | Rakestraw | 47/83 |
| 5,228,235 A | * | 7/1993 | Ishimoto | 47/60 |
| 5,515,648 A | * | 5/1996 | Sparkes | 47/65 |
| 5,584,141 A | * | 12/1996 | Johnson | 47/65 |
| 5,617,673 A | * | 4/1997 | Takashima | 47/60 |

FOREIGN PATENT DOCUMENTS

FR 2680074 * 2/1993 ............ A01G/9/20

OTHER PUBLICATIONS

Hydroponic Food Production, Howard m. Resh, Ph.D., p. 195, 4th edition, 1993.*
Hydroponic Food Production, pp. 194–194, Howard M. Resh, Ph.D., 1993.
Ad for Revolution Gardening in Vancouver, B.C. Yellow Pages, p 1020, (2000).

* cited by examiner

Primary Examiner—Charles T. Jordan
Assistant Examiner—Andrea M. Valenti
(74) Attorney, Agent, or Firm—Oyen Wiggs Green & Mutala

(57) ABSTRACT

A rotary plant growing apparatus has an open-ended cylindrical drum which rotates about a horizontal axis on a support stand. A lamp is positioned at the axis of the drum. Holes in the drum hold plant pots, with the plants facing the light and the bottom of the pots extending radially outward from the drum. A tray under the drum holds a pool of water and is spaced from the drum such that the lower part of the pots contacts the water as the drum rotates, watering the plants. The apparatus is particularly suitable for hydroponic gardening.

14 Claims, 8 Drawing Sheets

ROTARY PLANT GROWING APPARATUS

FIELD OF THE INVENTION

The invention pertains to a plant growing apparatus and, in particular, to an apparatus for growing plants in a drum which rotates about a light source.

BACKGROUND OF THE INVENTION

When plants are grown in a flat bed under a lamp, the plants are at varying distances from the lamp. Greater efficiency in the use of the light is obtained where all the plants being illuminated by a given light source are equidistant from it, reducing the number of lights needed for each productive square unit of growing area. This can be achieved by means of a rotary growing apparatus in which the plants are rotated about a light source at the axis of rotation.

SUMMARY OF INVENTION

The invention provides a rotary plant growing apparatus having a cylindrical drum which rotates horizontally on a support stand about an axially-positioned lamp. The apparatus is particularly intended for hydroponic growing, though it can also be used for growing plants in soil. Pots with seedlings are set in holes in the drum facing inward toward the lamp. A tray under the drum holds water with suitable nutrients and the pots contact the water as the drum rotates, watering and feeding the plants.

The drum is preferably made of lightweight molded plastic, formed in sections which attach together to form the assembled drum. Support members are affixed in channels at the ends of the drum to strengthen it.

The invention includes a planting pot specially adapted for fitting in the rotary drum and for holding a plant, a plant retaining disk and a growing medium.

DESCRIPTION OF THE PREFERRED EMBODIMENTS

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
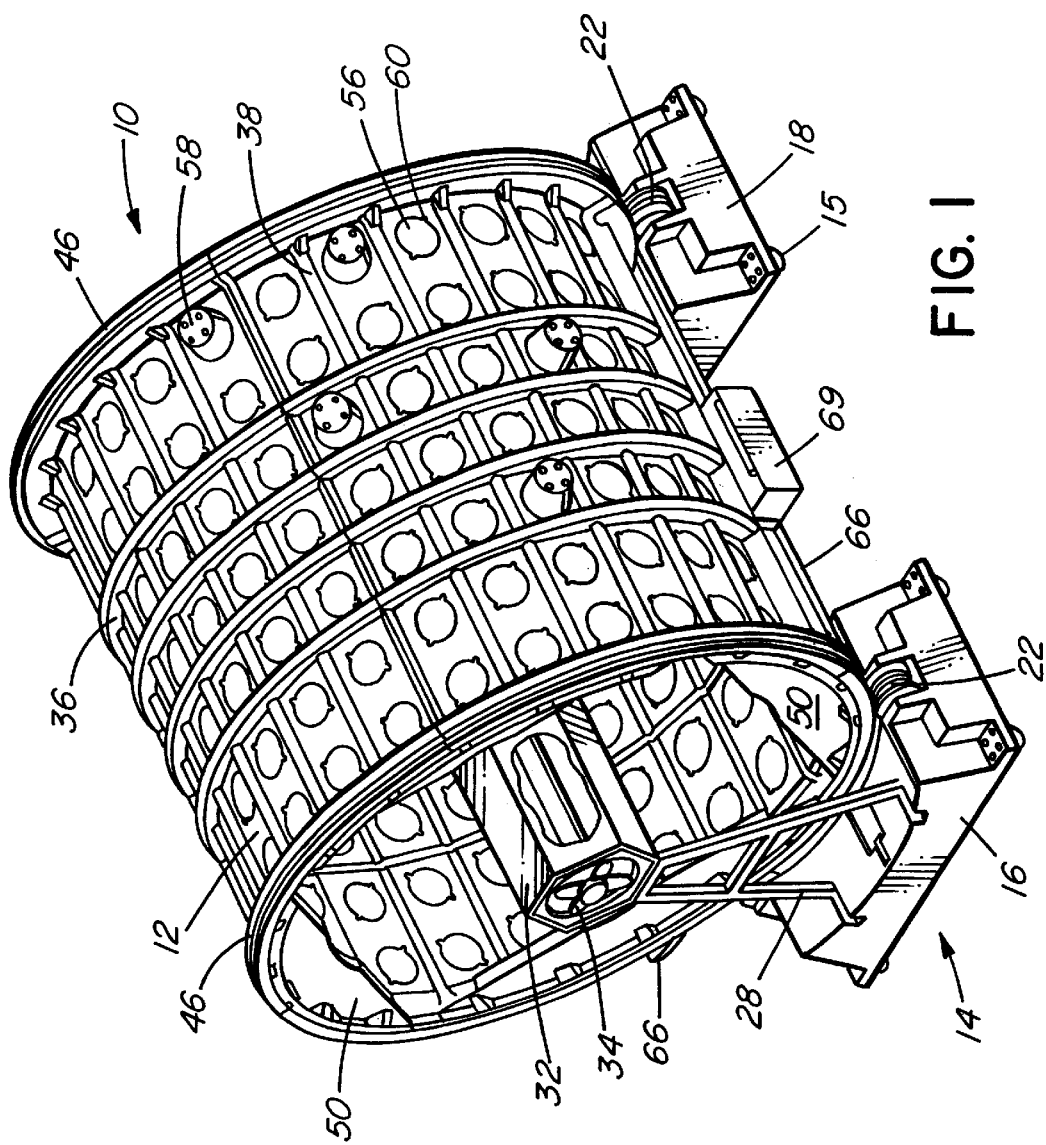
FIG. 1 is a top perspective view of a rotary plant growing apparatus according to the invention.
Figure 2:
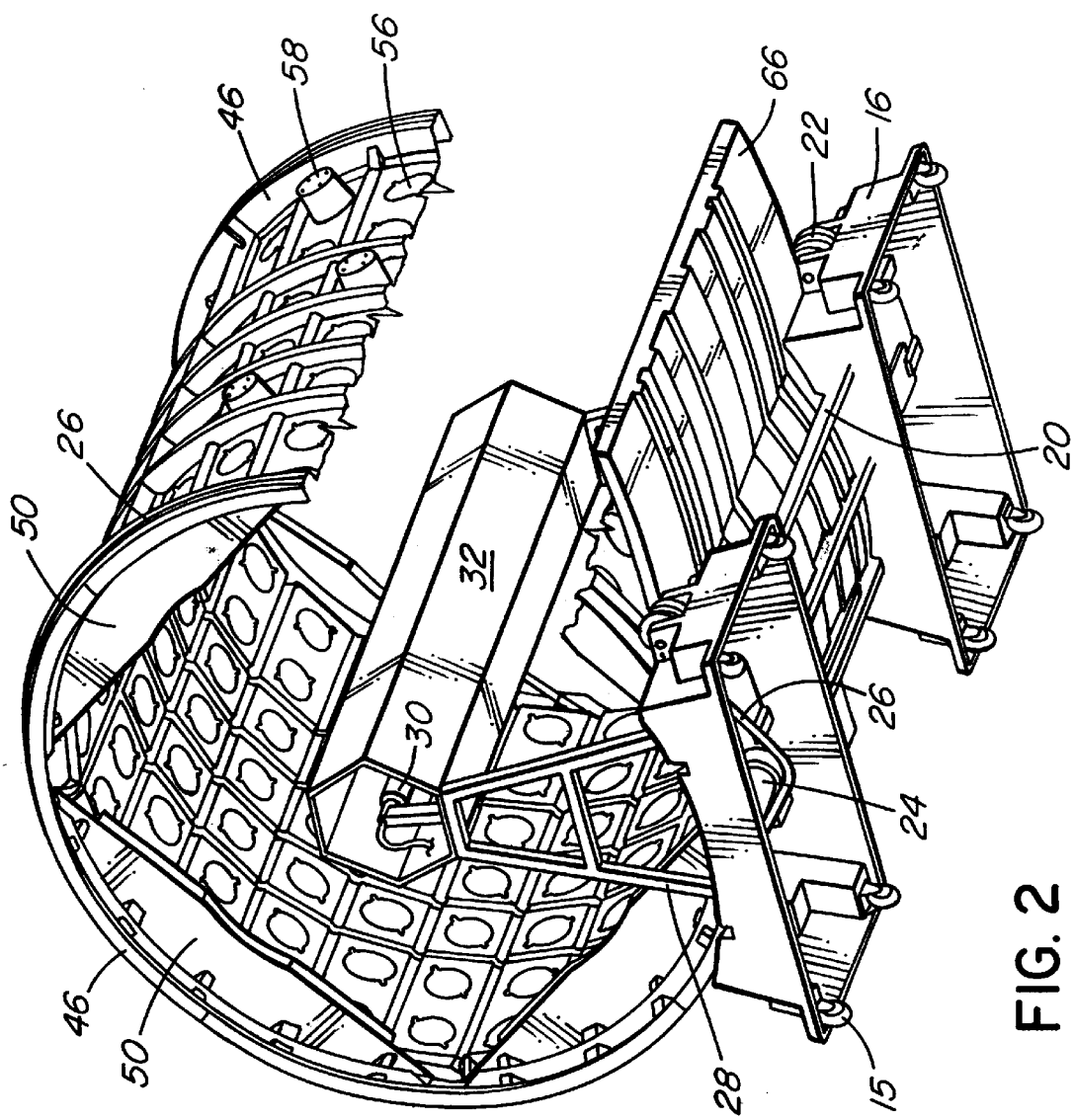
FIG. 2 is a partly cutaway, bottom perspective view of the apparatus from the diagonally opposite corner of FIG. 1.

Referring to FIGS. 1 and 2, the plant growing apparatus 10 has an open-ended cylindrical drum 12, shown partly cutaway in FIG. 2, which rotates in a substantially horizontal orientation on support stand 14. Stand 14 has two sections 16, 18 which are substantially the same in structure and are connected together by members 20. Each section 16, 18 has two drum support wheels 22 mounted for rotation about a horizontal axis to rotatably support drum 12. Section 18 of the support stand 14 includes an electric motor 24 mounted thereon to rotate drum 12. Motor 24 turns drive belt 26 which extends around the periphery of drum 12, as described below, to rotate the drum. Support stand 14 is supported on casters 15 to facilitate movement of the growing apparatus 10.

Lamp supports 28 are affixed to each end of the support stand 14 and hold lamp 30 at the axis of rotation of the drum 12. A translucent tube 32, preferably hexagonal or round in cross-section and open at both ends, (shown partly cutaway in FIG. 1) is supported on lamp supports 28 around the lamp, extending the length of the drum 12. An electric fan 34 is provided at one end of the tube. Fan 34 blows air through the tube to cool the lamp 30 and the interior of the drum 12.

Drum 12 is preferably made of a suitable, lightweight plastic material, such as ABS, about 0.187 inches in thickness, and has both circumferential ridges 36 and longitudinal ridges 38 for reinforcement. The drum consists of four longitudinal sections 40, shown in FIG. 3A, which have flanges 42 at their longitudinal edges. The sections 40 are connected together to form drum 12 by abutting their flanges 42 and fastening them together by means of bolts or other suitable fasteners in fastener holes 44. In this way, the drum 12 can be disassembled for shipping and easily reassembled.

The drum 12 can be any desired size, but is preferably about 40 inches in length and 48 inches in diameter. It is desirable to be able to reach in from each end as far as the center in order to place and remove pots.

Figure 3A:
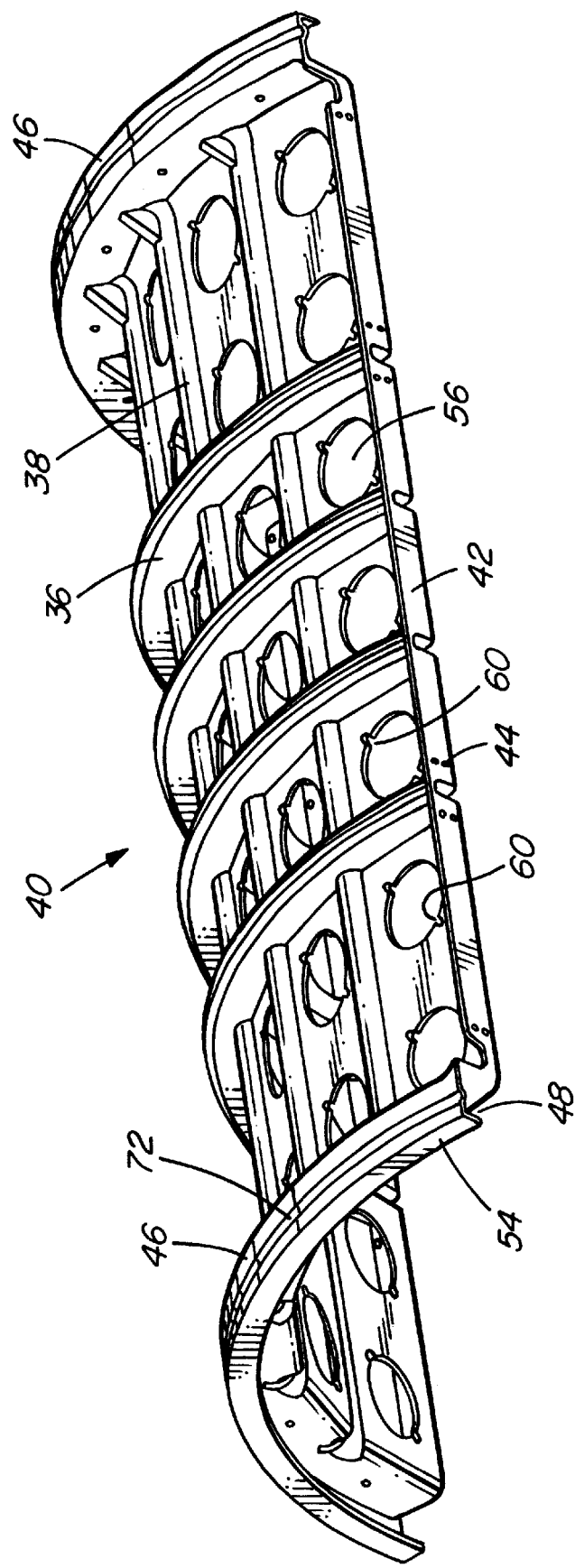
FIG. 3A is a perspective view of one segment of the rotary drum.
Figure 3B:
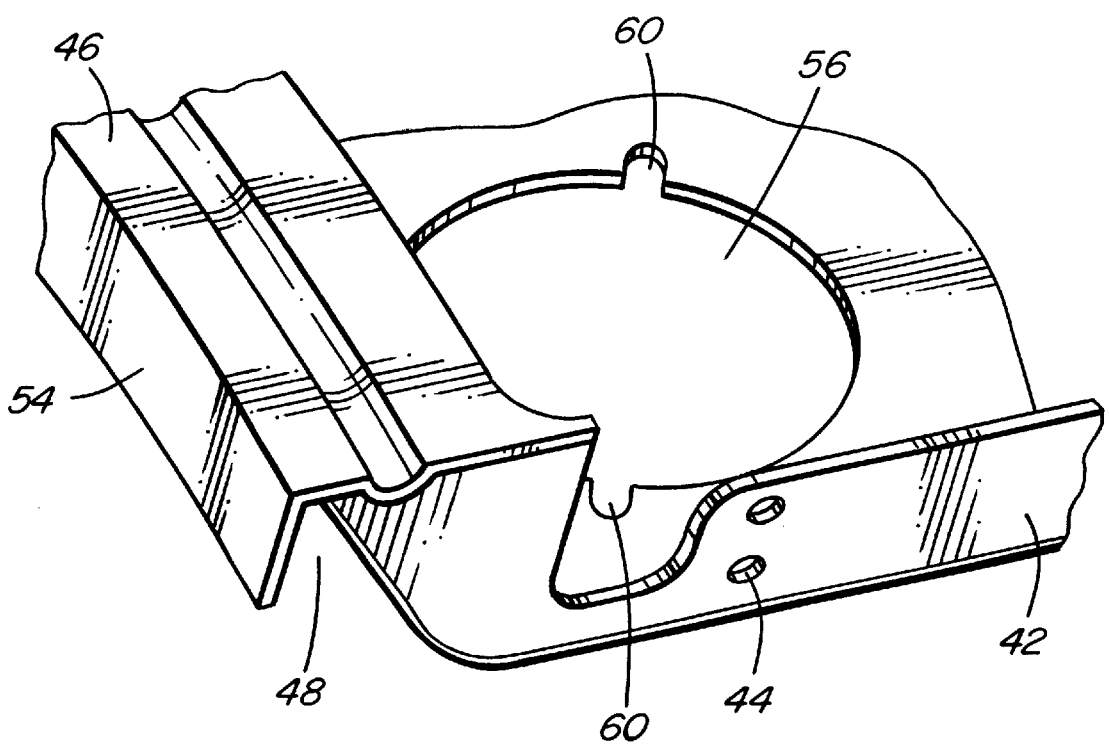
FIG. 3B is a close-up view of the end flange on the rotary drum.
Figure 3C:
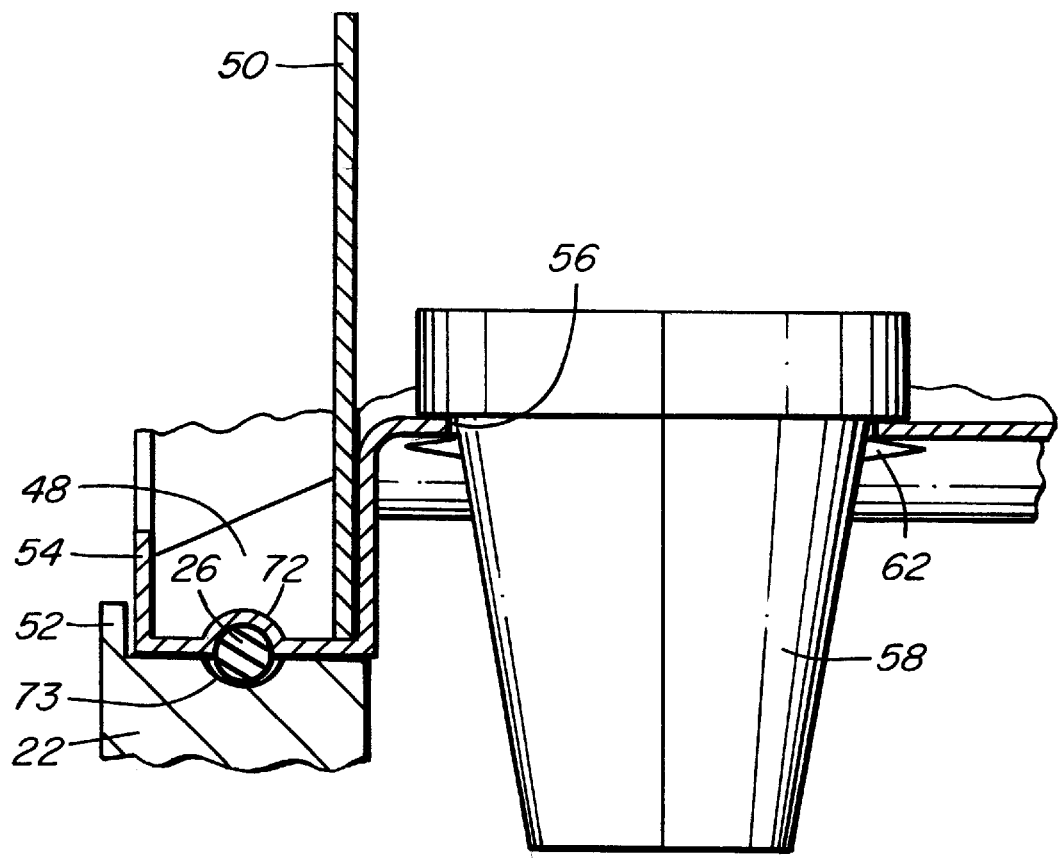
FIG. 3C is a cross-section view of a drum support wheel engaging the end flange of the rotary drum.

Referring to FIGS. 3A–3C, each end of drum 12 has a flange 46. The flange includes a channel 48 which is open along the inner radius of the flange and is adapted to receive drum support members 50. These members fit snugly into channel 48, filling its width, and are affixed therein by suitable fasteners. Each drum support member 50 is positioned so that it is centered at the abutment of two adjacent drum sections 40. Drum support members 50 help to support and maintain the cylindrical form of drum 12 as it rotates, carrying the weight of potted plants.

Flange 46 engages drum support wheels 22, each flange 46 being supported by two wheels 22. As shown in FIG. 3C, wheel 22 includes a portion 52 at the axial outer end thereof which is larger in diameter than the remainder of the wheel and engages the axially outer edge 54 of flange 46, to maintain drum 12 on the support wheels 22. Flange 46 has a groove 72 in its radially outer surface that receives and engages drive belt 26. Wheel 22 has a corresponding circumferential groove 73 that aligns with groove 72 when the drum 12 is positioned on support wheels 22. The drive belt 26 fits in the space formed by grooves 72 and 73. For convenience of assembly, both flanges 46 have a groove 72 and all four support wheels 22 have groove 73 so that drum 12 can be oriented either way on stand 14, though only one drive motor 24 and drive belt 26 is required to rotate the drum.

Figure 5A:
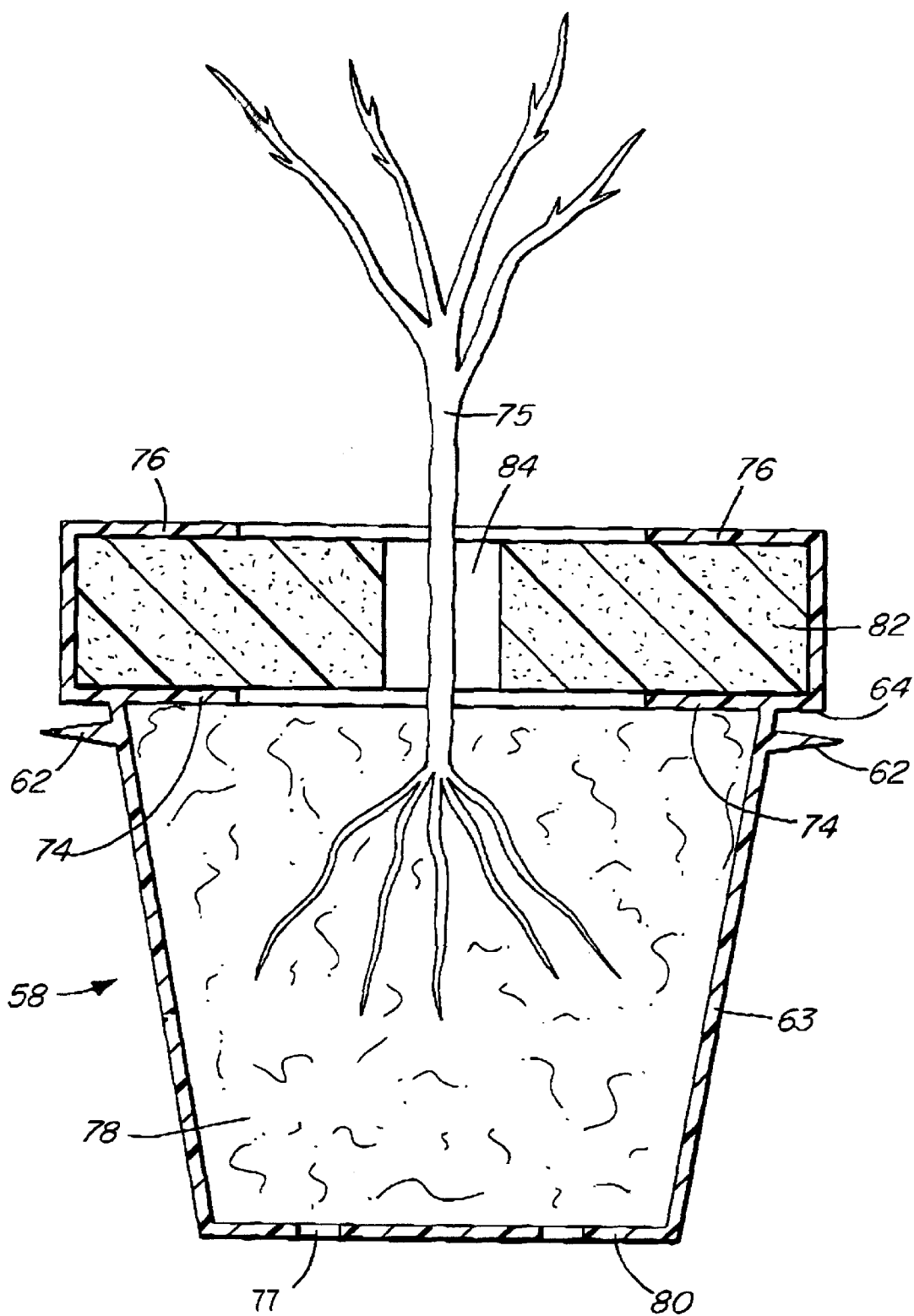
FIG. 5A is a cross-sectional view of the planting pot assembled with a plant, plant retaining disk and growing medium.

Drum 12 has a plurality of holes 56 arrayed across its surface to receive plant pots 58. Each hole 56 has a pair of opposed notches 60. Referring to FIG. 5A, pot 58 has a pair of outwardly-extending pins configured to line up with notches 60 when placed in hole 56. Pot 58 is tapered from top to bottom, being larger at the top than the bottom, and has a circumferential ledge 64 extending outward on its side wall 63. Pins 62 are positioned closely below ledge 64. Pot 58 is affixed to drum 12 by inserting it through a hole 56 from the inside, with the bottom of the pot extending radially outward, fitting pins 62 through notches 60. The diameter of hole 56 is slightly larger than the diameter of pot 58 immediately below ledge 64, and is smaller than the diameter of the pot above ledge 64. Accordingly, the ledge 64 abuts against drum 12 and, when the pot 58 is turned a quarter turn, pot 58 is held in place on drum 12 between its ledge 64 and pins 62.

Figure 4:
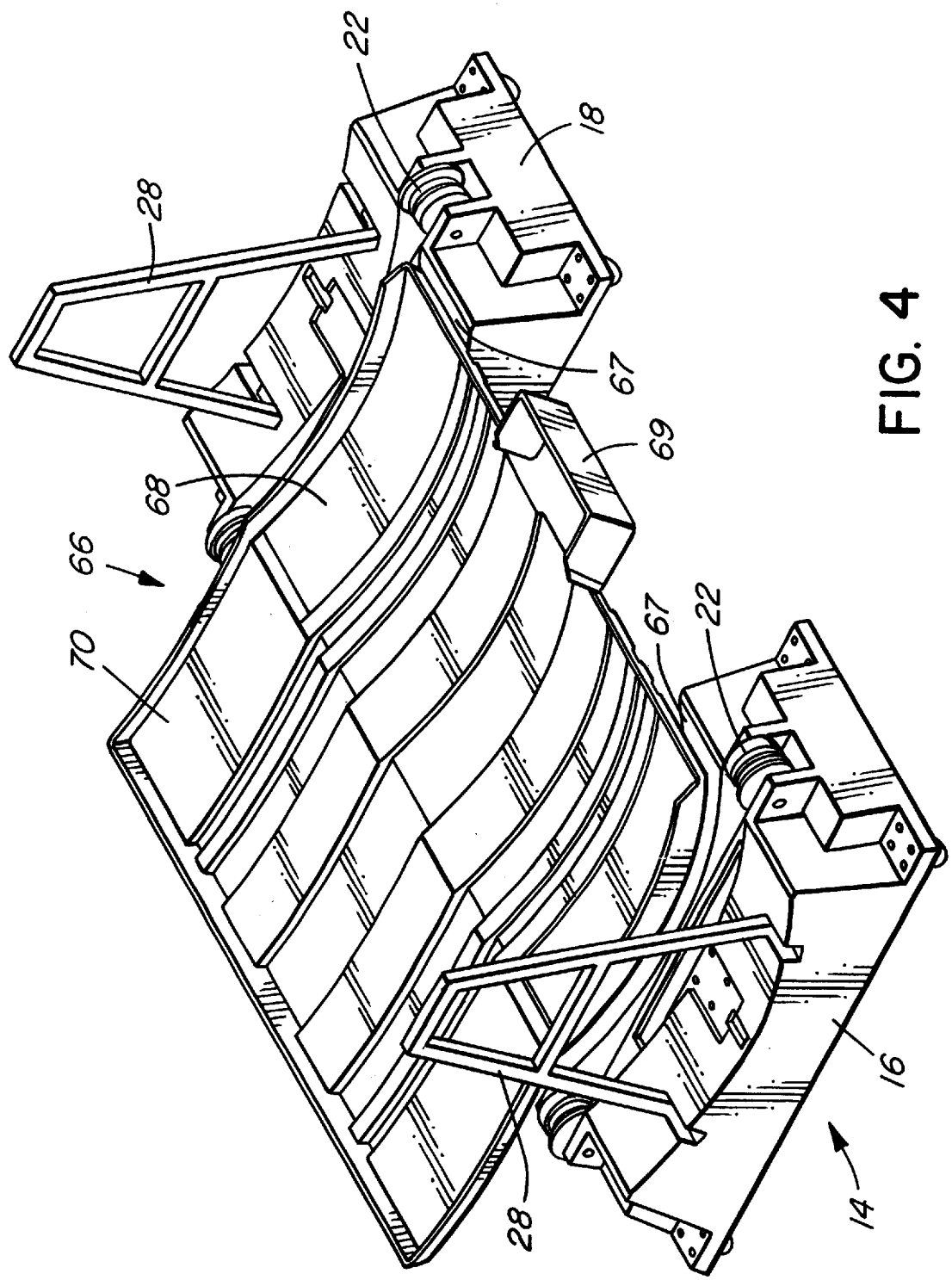
FIG. 4 is a perspective view of the support stand and tray.

Referring to FIG. 4, stand 14 holds tray 66 under drum 12, resting on surface 67 of stand 14. Tray 6 has two parts, water-holding part 68 and drip catching part 70. Water-holding part 68 is positioned directly under drum 12 and holds a pool of water with suitable plant nutrients, fed by a reservoir or other external source. The level of water is controlled by a float valve (not shown) in pan 69. Tray 66 is spaced from the drum 12 such that the pots 58 move freely past the tray as the drum rotates, but the lower part of each pot is immersed in the pool of water providing water and nutrients to the plant 75 through openings 77 in the bottom of the pots.

Drip-catching part 70 of the tray extends under the portion of the drum that rotates upward from the pool of water, and catches excess water that falls off the pots, draining it back into water-holding part 68.

Figure 5B:
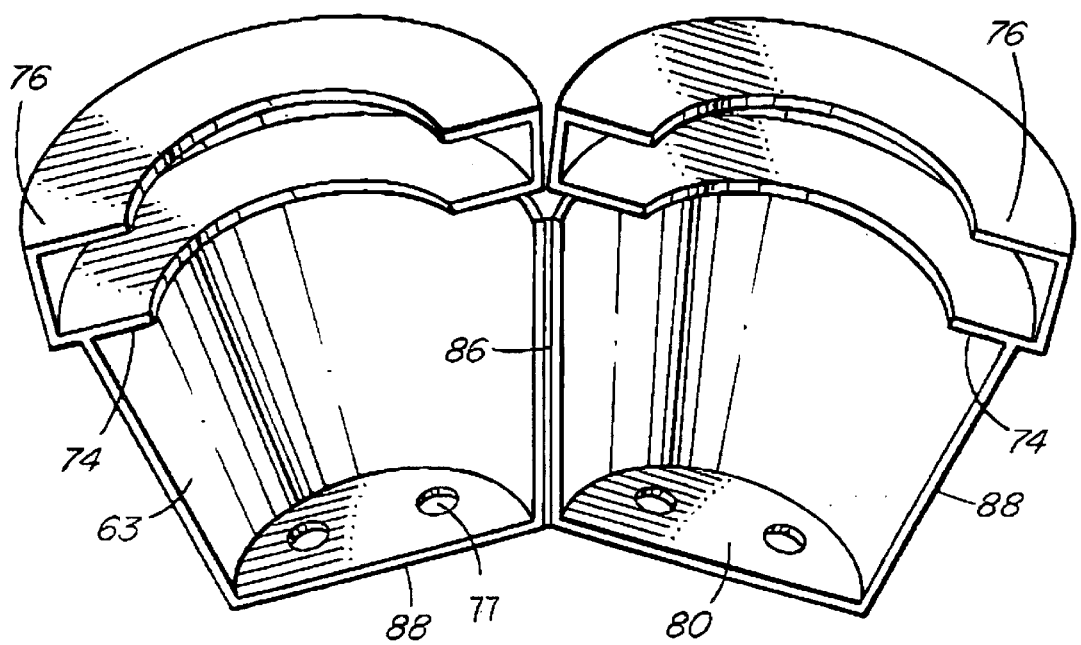
FIG. 5B is a perspective view of the planting pot in the open position.

Pot 58 is specially designed for receiving the plant and growing medium and holding it therein when inverted in the drum. Referring to FIGS. 5A and 5B, pot 58 has a first inwardly-extending ledge 74 and a second inwardly-extending ledge 76 above it. A fibrous growing medium 78, such as rock wool, is held between the bottom wall 80 of the pot and the ledge 74. A plant-retaining disk 82, for example made of neoprene foam, is held between ledge 74 and ledge 76, with the plant 75 extending through slit 84 in the disk 82. Pot 58 is openable like a clamshell, having a hinge 86 in the side wall and a cut 88 in the side wall on the opposite side and in the bottom wall 80. This permits easy insertion of the growing medium, plant and disk. The pot 58 is held closed when inserted in a hole 56 of the drum 12.

To operate the growing apparatus, potted seedlings are placed in the drum and the drive motor is set to rotate the drum at a desired speed, for example 1 revolution per hour, in the direction shown by arrow A in FIG. 2. Water with nutrients is supplied to the water tray, and the lamp is illuminated.

The preferred embodiments described above are intended to illustrate the principles of the invention, but not to limit the scope of the invention. Various other embodiments and modifications to the preferred embodiments may be made by those skilled in the art without departing from the scope of the invention. For example, the lamp can be a fluorescent-type lamp which generates little heat and, in such case, a cooling fan and tube are not required. Various mechanical structures for holding the pot in the hole in the drum can be provided, such as latches and threaded sleeves. The drum could be rotated by driving the support wheels rather than having a belt around the drum. In the plant pot, the ledges can be segmented, i.e. in the form of tabs, rather than continuous. The drum is preferably open at both axial ends, but it could be closed or partially closed at one or both ends if desired. The pot can be constructed with a latch or other snap-type fitting so that it can snap shut and does not require to be set in hole 56 of the drum in order to be held closed. Also, rather than have a hinge, the pot can be made in two separate parts, each of which is a longitudinal half of the pot, having an attachment mechanism to snap and hold the parts together. The scope of the invention is defined by the claims that follow.

What is claimed is:

1. A rotary hydroponic plant growing apparatus, comprising:

(a) a cylindrical drum;

(b) a support stand for said drum, said stand having rotatable supports to support said drum for rotation of said drum about its axis in a substantially horizontal position;

(c) drive means to rotate said drum on said rotatable supports;

(d) a light source inside said drum about which said drum rotates;

(e) said drum being adapted to hold a plurality of plant pots wherein plants grow hydroponically in such orientation that said plants growing in said pots face radially inwardly of said drum, toward said light source, and roots of said plants face radially outwardly of said VP drum; and (f) water feeding apparatus for feeding nutrient solution into said plant pots held by said drum for watering said plants as said drum rotates.

2. An apparatus according to claim 1 wherein said drum comprises a plurality of longitudinal segments adapted to be affixed together along their longitudinal edges to form said drum.

3. An apparatus according to claim 1 wherein said drive means comprises a drive motor and a belt which extends circumferentially around said drum.

4. An apparatus according to claim 1 wherein said light source comprises a lamp and a tube surrounding said lamp open at both axial ends thereof.

5. An apparatus according to claim 4 further including a fan adapted to blow air through said tube.

6. An apparatus according to claim 1 wherein said drum has a circumferential flange at both axial ends thereof to engage said rotatable supports.

7. An apparatus according to claim 6 wherein said flange has a circumferential channel open toward said axis of said drum, and wherein said apparatus further comprises a plurality of drum support members affixed in said circumferential channel.

8. An apparatus according to claim 7 wherein said drum comprises a plurality of longitudinal segments adapted to be affixed together along their longitudinal edges to form said drum, and wherein each drum support member extends between and is affixed to at least two adjacent ones of said longitudinal segments.

9. An apparatus according to claim 1 wherein said water feeding apparatus comprises a container for holding water positioned adjacent to said drum, and wherein said plant pots have openings therein, such that, as said drum rotates, said plant pots held by said drum contact said water in said container for watering said plants through said openings in said pots.

10. An apparatus according to claim 9, wherein said container comprises a tray supported under said drum.

11. An apparatus according to claim 10 wherein said tray includes a portion extending under the periphery of said drum to receive water dripping from said plant pots as said drum rotates.

12. An apparatus according to claim 1, wherein said drum has a plurality of holes to receive said plant pots.

13. An apparatus according to claim 12 further including plant pots fitted in said holes.

14. An apparatus according to claim 13 wherein said holes have notches and said pots have projections which fit in said notches and engage said drum to hold said pots in said holes.

* * * * *

UNITED STATES PATENT AND TRADEMARK OFFICE
CERTIFICATE OF CORRECTION

PATENT NO. : 6,604,321 B2
DATED : August 12, 2003
INVENTOR(S) : Ted Marchildon

It is certified that error appears in the above-identified patent and that said Letters Patent is hereby corrected as shown below:

Column 3,
Line 29, "Tray 6" should read -- Tray 66 --.
Line 30, "drip catching" should read -- drip-catching --.
Line 37, "water providing" should read -- water, providing --.

Column 4,
Line 47, "VP drum" should read -- drum --.

Signed and Sealed this

Sixth Day of April, 2004

JON W. DUDAS
*Acting Director of the United States Patent and Trademark Office*